T. M. SWANK.
LOCK VALVE.
APPLICATION FILED FEB. 11, 1909.
939,108.
Patented Nov. 2, 1909.
2 SHEETS—SHEET 1.
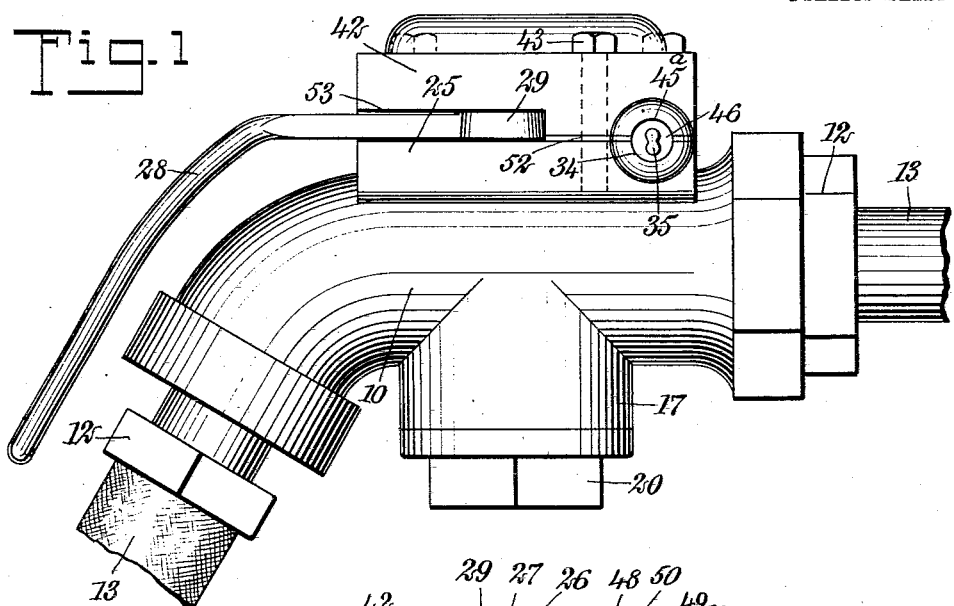
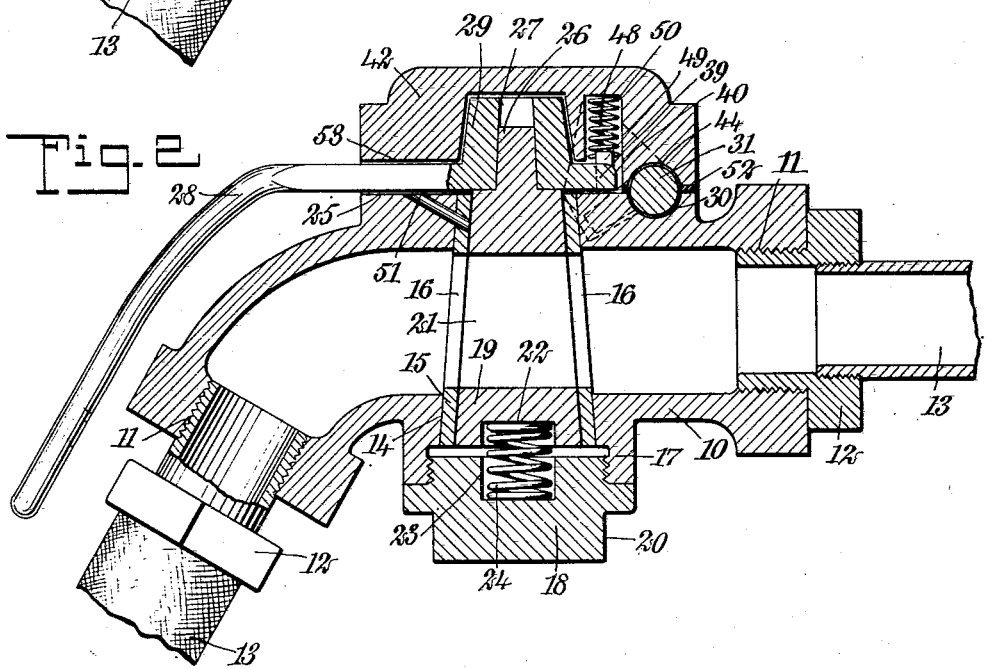
WITNESSES
J. A. Brophy
John K. Brachvogel
INVENTOR
Thomas M. Swank
BY Munn & Co.
ATTORNEYS

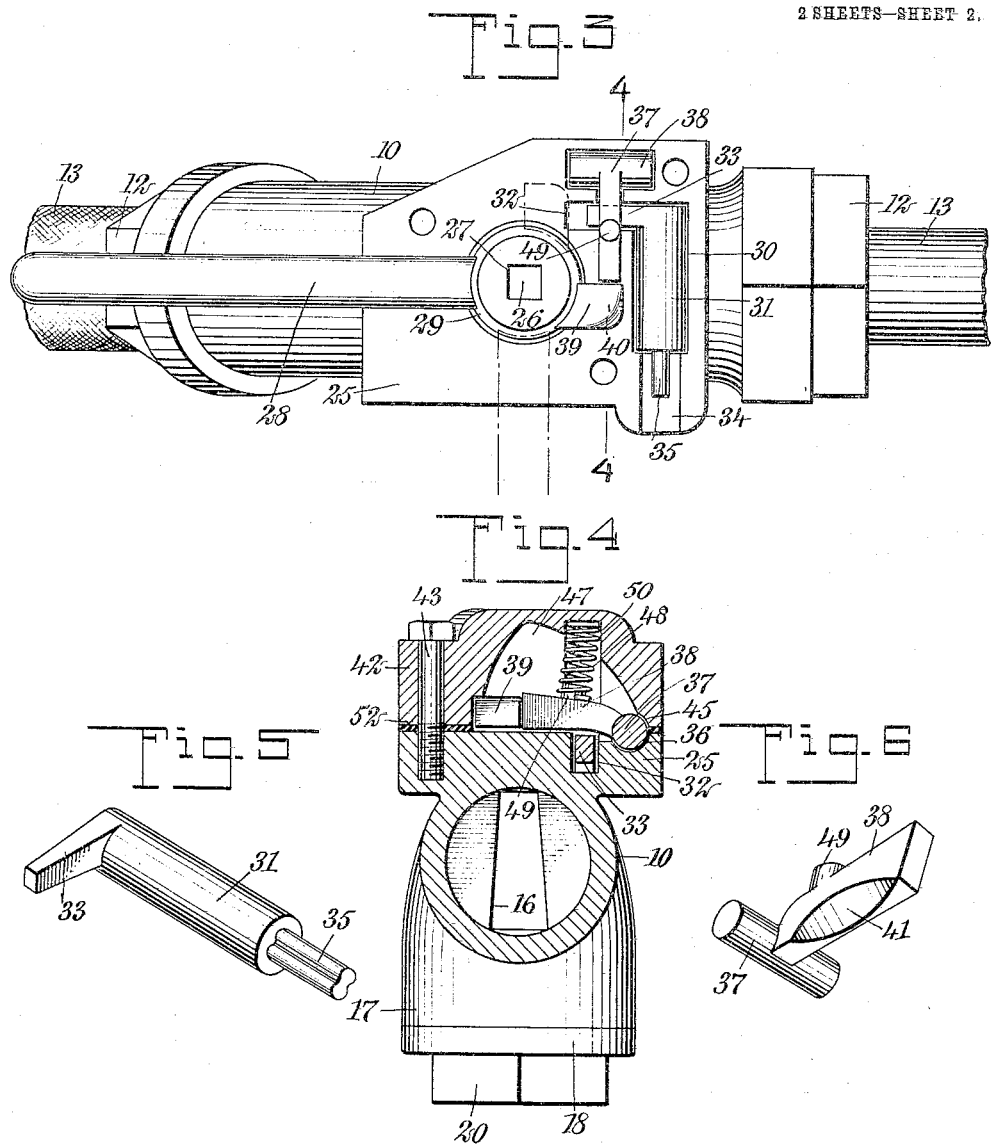

UNITED STATES PATENT OFFICE.

THOMAS M. SWANK, OF LOUISVILLE, KENTUCKY.

LOCK-VALVE.

939,108.  Specification of Letters Patent.  Patented Nov. 2, 1909.

Application filed February 11, 1909. Serial No. 477,431.

*To all whom it may concern:*

Be it known that I, THOMAS M. SWANK, a citizen of the United States, and a resident of Louisville, in the county of Jefferson and State of Kentucky, have invented a new and Improved Lock-Valve, of which the following is a full, clear, and exact description.

This invention relates to lock valves especially useful in connection with air-brake systems for railway trains and the like, and relates more particularly to a lock valve in which the plug is operable in the usual manner to open and close the valve, and which includes key-controllable locking mechanism for holding the valve plug in a position such that when the valve is open, the locking mechanism is inoperative to hold the valve plug against a movement to open the valve, from a closed position.

An object of the invention is to provide a simple, durable and efficient valve for use in connection with the train pipe of an airbrake system, which has locking mechanism serving to prevent unauthorized and malicious tampering with the valve, which also prevents accidental closing of the valve when the same is open, which is easily operated, and which will not cause unnecessary delay in certain operations such as in switching or coupling cars.

A further object of the invention is to provide a valve having locking mechanism controlling the valve plug, in which the plug is spring-held to prevent moisture from condensation of air reaching the locking mechanism to rust the same, and in which the valve plug is surrounded by a bushing which itself is held against movement with the plug, to prevent the accidental closing of the valve.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of an embodiment of my invention; Fig. 2 is a longitudinal section of the same; Fig. 3 is a plan view of the valve, showing the cover removed to disclose the locking mechanism; Fig. 4 is a transverse section on the line 4—4 of Fig. 3; Fig. 5 is an enlarged perspective view of the tumbler of the locking mechanism; and Fig. 6 is a similar view of the keeper of the locking mechanism which holds the valve plug against movement from an open to a closed position.

Before proceeding to a more detailed explanation of my invention, it should be clearly understood that while the locking mechanism of the valve holds the same open so that no unauthorized person can close the valve to set the brakes of the train, the valve, when in a closed position, can be opened without necessitating the use of a key to release the locking mechanism. Thus, there is no loss of time, for example, in coupling a car to a train already made up. It will be understood that in this operation it is necessary to open the closed train line valve of the last car in effecting the coupling. Under other circumstances, too, there is no loss of time when it is necessary to open a closed valve. However, when the valve is open, no person not in possession of the proper key can operate the valve to close it, unless the locking mechanism is opened by means of a skeleton key, or in some other similar manner requiring the exercise of particular skill, and involving the expenditure of considerable time. In my valve, the valve plug is spring-held in a bushing which is secured against turning with the valve plug. The valve plug is tapered, so that under the tension of the spring it is held securely in the bushing, and it is difcult for moisture resulting from the condensation of the air in the valve to penetrate to the locking mechanism to rust or otherwise injure the same. Furthermore, the locking mechanism is covered and is protected from injury. The cover also prevents accident to the valve, as it is impossible for the locking mechanism to be accidentally struck and disarranged. On several occasions it has happened that the bushing of a valve has turned with the valve plug, thereby rendering the valve inoperative and causing serious trouble. In my valve the bushing is rigidly held, to avoid such a possibility.

Referring more particularly to the drawings, I provide a valve body or casing 10, in general, of any preferred or common form, having opposite, threaded openings 11 each of which receives a coupling 12 by means of which the valve is connected with a train pipe section 13. The valve body has a transverse, tapered opening 14 therethrough, in which is arranged a correspondingly formed bushing 15 having openings or ports 16, so that the air can flow freely through the valve. The bushing is held against a rotary movement by a pin 51 extending diagonally through a suitable opening from the top of the valve body, to and into an opening of the bushing. At the under side of the valve is an annular extension 17 interiorly threaded to receive a retaining member 18 which holds the valve plug 19 in position. The retaining member has a squared or otherwise suitably formed head 20 so that it can be manipulated by means of a suitable tool. The valve plug has a passage 21 therethrough which in a certain position of the plug permits the air to flow freely through the valve, while in other positions of the plug, obstructs the ports or apertures 16 to close the valve. The valve plug and the retaining member, at adjacent faces have spring seats or sockets 22 and 23 respectively, in which is positioned a spring 24 tending normally to force the plug upward in the bushing and to insure a tight though movable engagement of the plug within the bushing.

At the upper part, the valve casing has a flat seat 25, provided with an opening through which the upper end of the plug extends. This end of the plug has a stem 26, of angular cross section and adapted to be received by a correspondingly formed opening 27, in the head 29 of an operating handle 28. The latter is of any suitable form and serves for the manipulation of the plug. As the opening 27 receives the stem 26 so that the latter is freely movable longitudinally of the opening, it permits the handle to be removed from the valve, and allows the parts to adjust themselves as the plug wears.

The top part 25 of the body has a depression 30, substantially of semi-cylindrical form and movably receiving a cylindrical tumbler 31. The depression 30, at one end, has a lateral extension 32, which normally receives a projection or arm 33 of the tumbler. At the other end, the depression 30 has a key-hole extension 34, which receives a constricted part 35 of the tumbler. The constricted part 35 may be of any suitable form to fit a correspondingly shaped key used in operating the locking mechanism, as will appear more clearly hereinafter. As shown, for example, herewith, the constricted part 35 may be fluted.

The part 25 of the body has a further depression 36, of semi-cylindrical form and adapted to receive movably, a pintle 37 rigid with a keeper 38. The pintle is at right angles with the keeper and the latter is arranged to extend across the arm 33 of the tumbler, so that it can engage a stop 39, rigid with the head 29 of the handle, to lock the handle in a position such that the valve is open. The stop has an edge 40 beveled and adapted to slide under a corresponding beveled edge 41 of the keeper to raise the latter to an inoperative position when the valve is being turned from a closed to an open position.

Upon the part 25 of the valve body is mounted a removable cover 42, held in place by means of bolts 43 or the like, and having a cut away part 53, which permits the handle 28 to swing freely. The cover has recesses 44 and 45, corresponding to the recesses 30 and 36, and likewise movably receiving the tumbler and the keeper pintle. The recess 44 also has an extension 45ᵃ forming with the key-hole part 34, a key-hole 46 into which a suitable key can be inserted to operate the tumbler. The cover, furthermore, has an enlarged recess 47 which permits the keeper to move upwardly out of engagement with the stop 39 when the tumbler is operated by means of the key, so that the arm 33 forces the keeper into an inoperative position. A spring 48 engages a stud 49 of the keeper and has the upper end located in a recessed seat 50 of the cover, and tends normally to hold the keeper depressed.

I prefer to position a gasket 52, between the top 25 of the valve body and the cover 42, to insure a tight fit of the parts.

It will be understood that when the handle of the valve is in such a position that the valve is open, the stop 39 engages at the end of the keeper to prevent the handle from being moved into a position such that the valve is closed. When it is desired to close the valve, a suitable key is inserted in the key-hole 46 and the tumbler is turned thereby, so that the arm is swung upwardly, carrying with it, against the tension of the spring 48, the keeper 38. The stop 39 can then move under the keeper, so that the valve can be closed. When the key is released, the locking mechanism parts return to their original positions, with the stop 39 at a point indicated in dotted outline on Fig. 3. The valve is now closed, and it can be opened by merely swinging the handle into the open position, without the use of a key, for the stop can pass freely under the keeper, displacing the same to an inoperative position until the handle reaches an open position.

Having thus described my invention, I claim as new, and desire to secure by Letters Patent:—

1. A valve, comprising a valve body, an operating member for the body, a keeper for engaging the said member to lock the body in an open position, and a key controlled means for operating the keeper to permit the valve body to be moved into a closed position, the keeper being moved into an inoperative position by the operating member when moving the body from a closed to an open position.

2. A valve, comprising a valve body, an operating handle for the body, having a projection, a keeper for engaging the projection of the handle to lock the body in an open position, and key operated means for operating the keeper to permit the valve body to be moved into a closed position, the keeper being moved into an inoperative position by the projection of the handle when moving the valve body from a closed to an open position.

3. A valve comprising a valve body, a handle for operating the body, having a projection, a keeper for engaging the projection of the handle to lock the valve body in an open position, and a key operated rocking tumbler for disengaging the keeper from the said projection.

4. In a valve, a valve plug having an open and a closed position, a pivoted keeper controlling said plug, and a key-controllable rocking tumbler for operating said keeper, said keeper being inoperative with respect to said plug when the latter is in a closed position.

5. In a valve, a valve plug, a keeper, a stop controlling said plug and adapted to engage said keeper to hold said plug in an open position, and a tumbler controlling said keeper and operable by means of a key, said stop displacing said keeper to an inoperative position when moving from one position to another corresponding respectively, to a closed and an open position of said plug.

6. In a valve, a valve plug having an open and a closed position, a stop movable with said plug, a keeper adapted to engage said stop to lock said plug in an open position, said stop and said keeper being adapted to engage inoperatively when said stop moves from one position to another corresponding respectively, to a closed and an open position of said plug, a tumbler having an arm adapted to displace said keeper when said tumbler is operated, and a spring tending to hold said keeper in a normal, operative position, said tumbler being operable by means of a key.

7. In a valve, a valve casing, a plug in said casing and having an open and a closed position, a handle controlling said plug and having a stop, a pivotally movable keeper adapted to engage said stop to hold said plug in an open position, a rotatable tumbler having an arm under said keeper, whereby when said tumbler is rotated said keeper is displaced into an inoperative position with respect to said stop, said tumbler having a part adapted to be engaged by a key, a spring normally holding said keeper operative, and a cover on said casing and protecting said keeper and said tumbler, said casing and said cover having recesses movably receiving said keeper and said tumbler, said casing and said cover forming a keyhole receiving said constricted part of said tumbler.

8. A valve, comprising a valve body, a member carried by the valve body, a keeper engaging the said member to lock the valve body in an open position, and a key controlled tumbler for operating the keeper to disengage it from the said member to permit the valve body to be moved into a closed position.

In testimony whereof I have signed my name to this specification in the presence of two subscribing witnesses.

THOMAS M. SWANK.

Witnesses:
WALTER D. MILLER,
L. W. O'NEIL.